July 5, 1938.  B. P. JOYCE  2,122,423
ROUND FEEDING MECHANISM
Filed Sept. 19, 1935  12 Sheets-Sheet 1
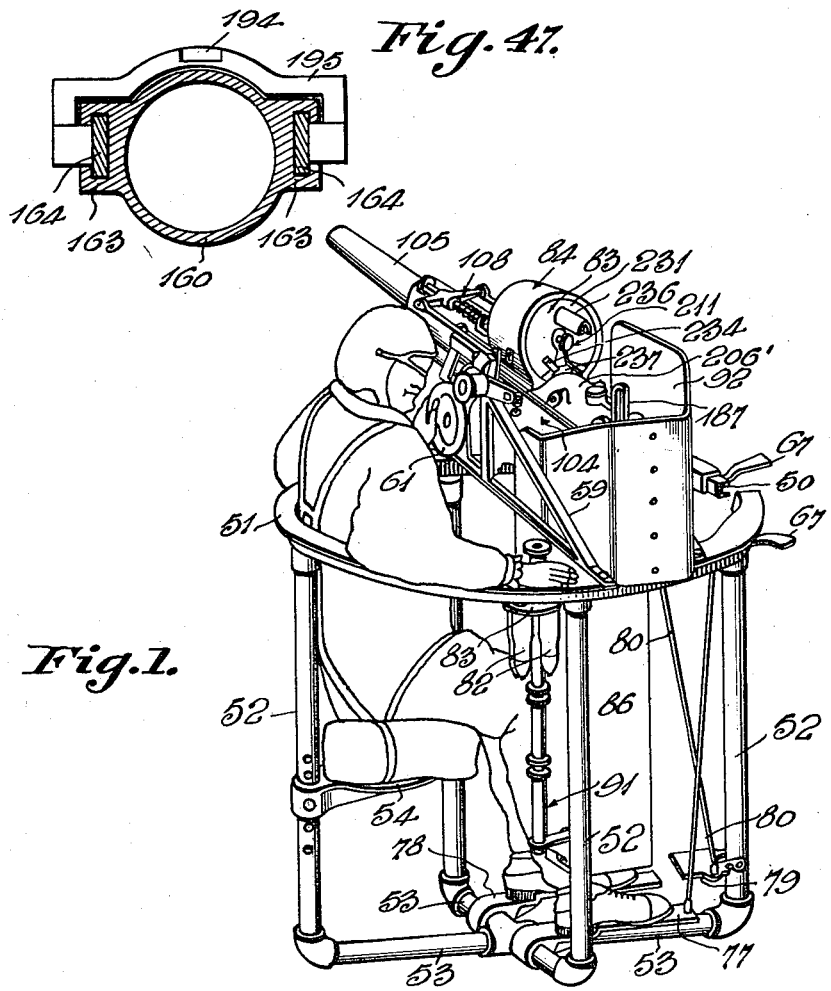
Fig. 47.
Fig. 1.
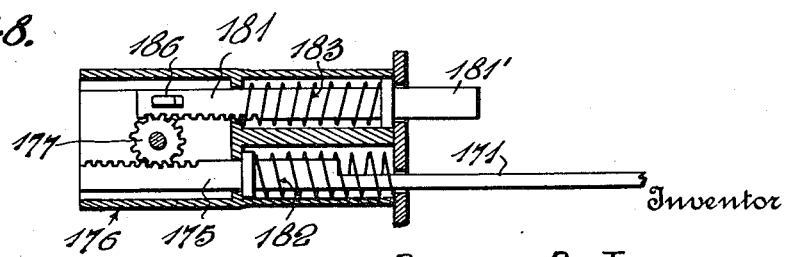
Fig. 48.
Witness
H. Woodard
Inventor
BRYAN P. JOYCE
By H. B. Willson & Co.
Attorneys.

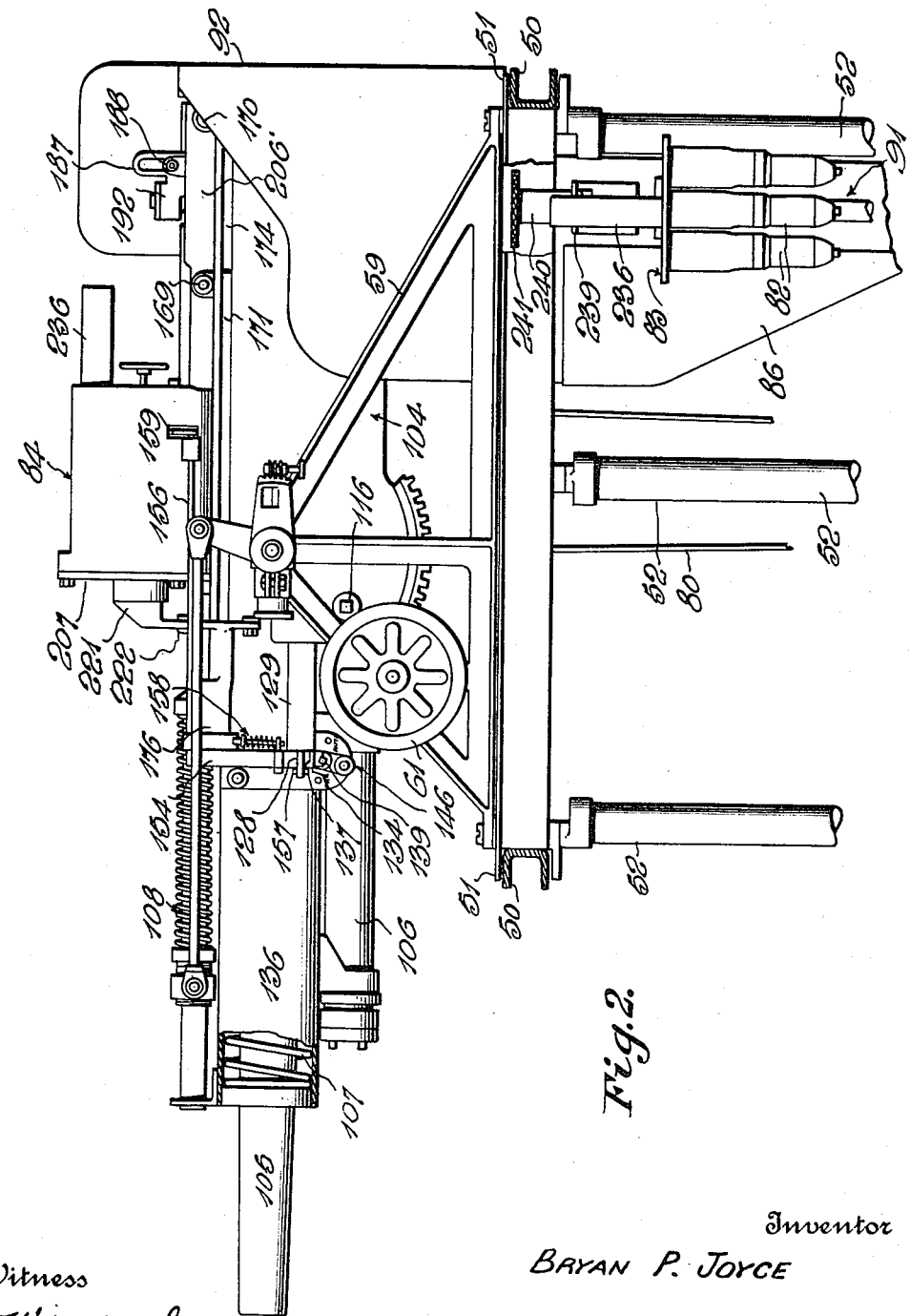

July 5, 1938.   B. P. JOYCE   2,122,423
ROUND FEEDING MECHANISM
Filed Sept. 19, 1935   12 Sheets-Sheet 3
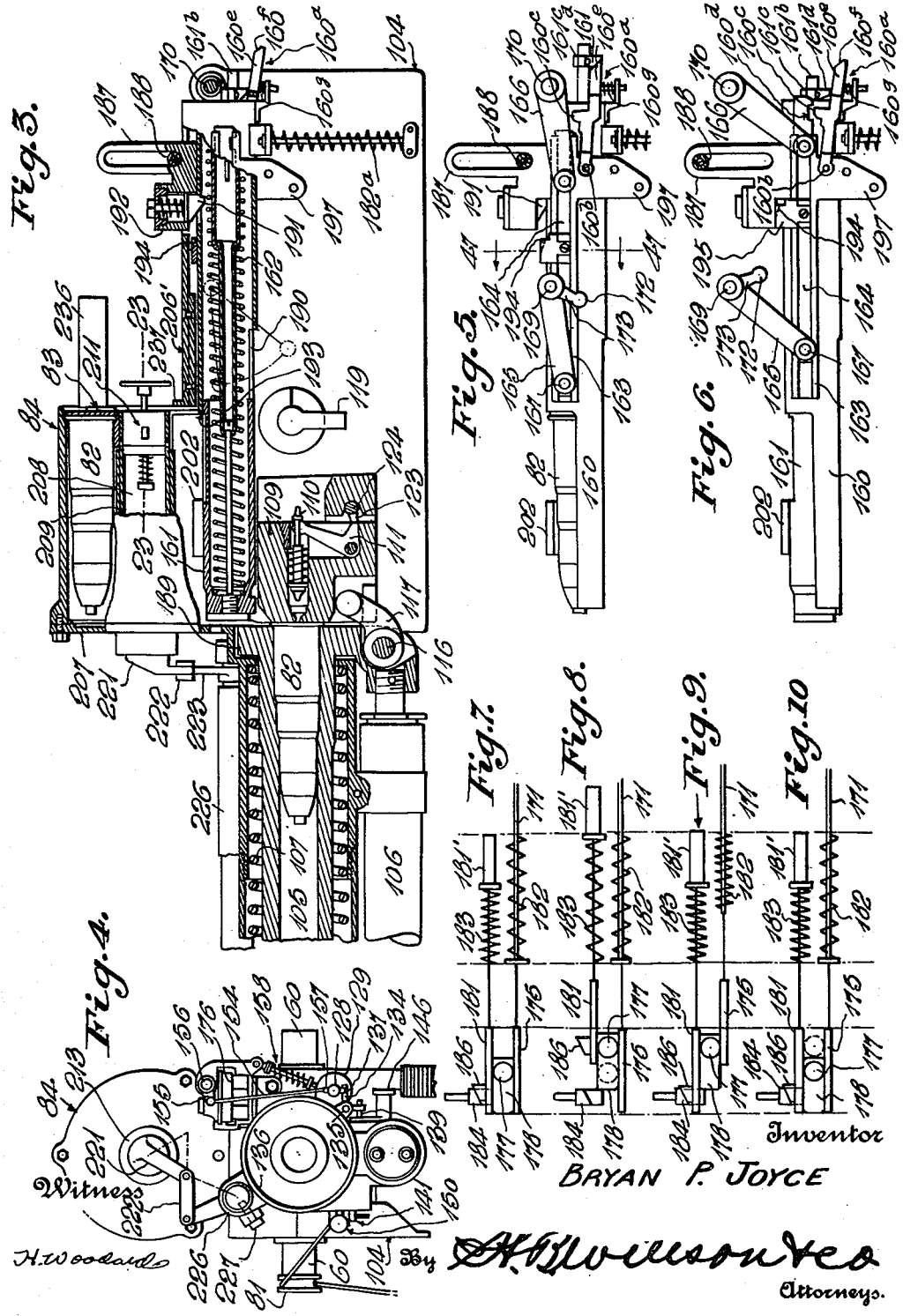
Inventor
BRYAN P. JOYCE

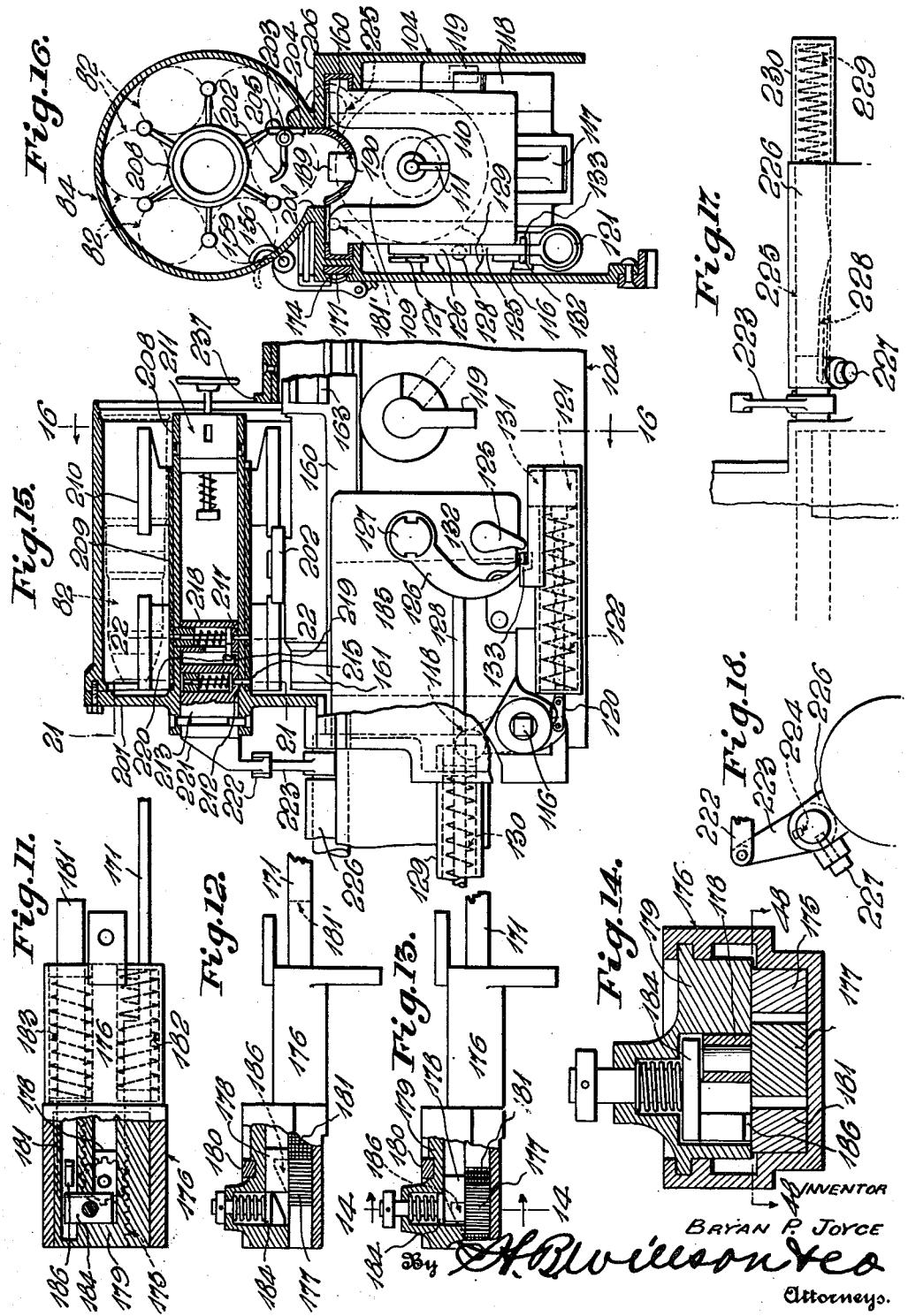

July 5, 1938. B. P. JOYCE 2,122,423
ROUND FEEDING MECHANISM
Filed Sept. 19, 1935 12 Sheets-Sheet 5
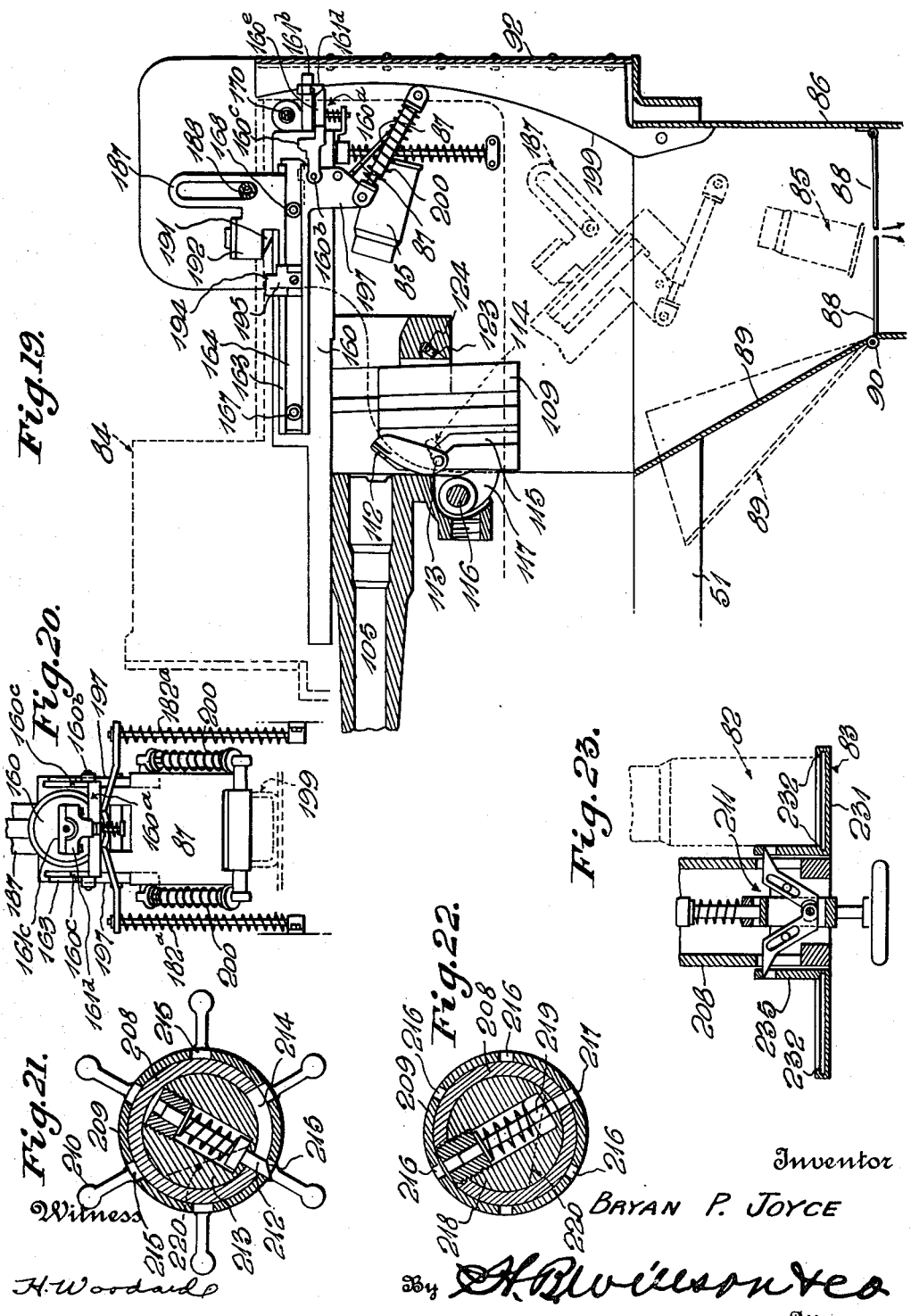
Inventor
BRYAN P. JOYCE
Witness
H. Woodard
By H. B. Willson & Co.
Attorneys.

July 5, 1938.　　　　B. P. JOYCE　　　　2,122,423
ROUND FEEDING MECHANISM
Filed Sept. 19, 1935　　　12 Sheets-Sheet 6
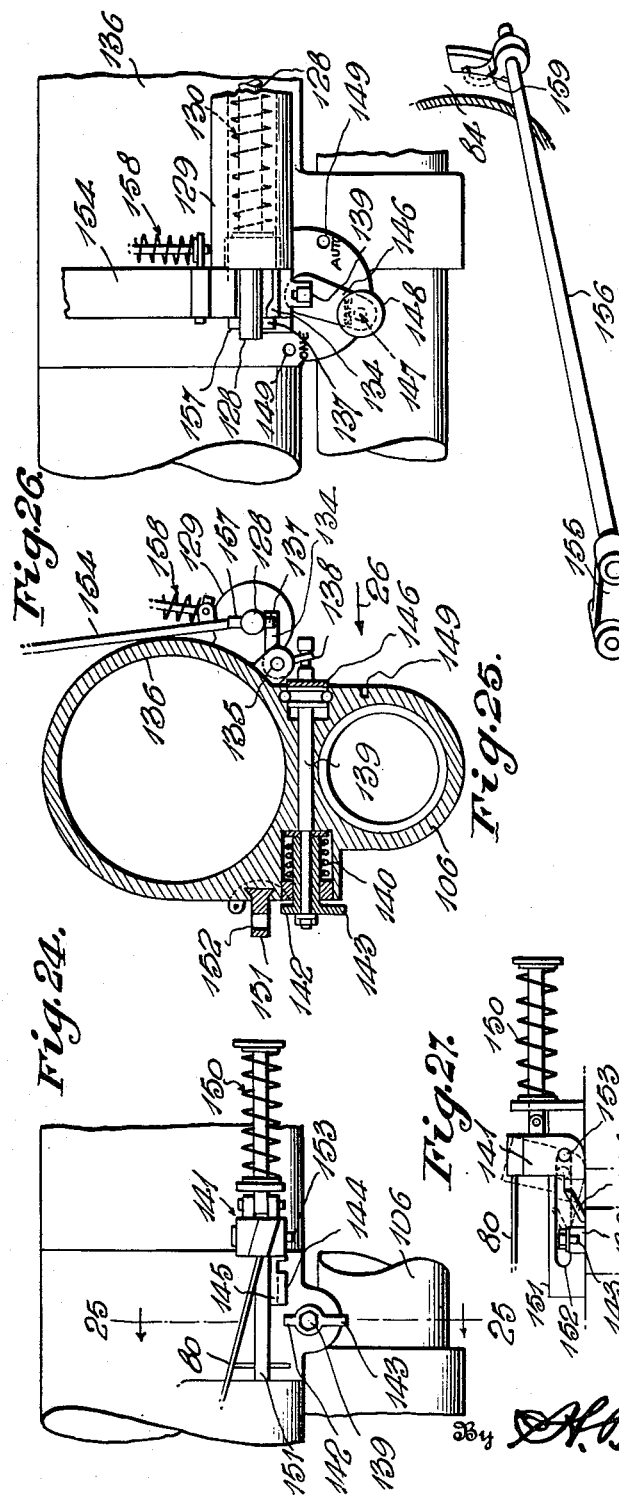
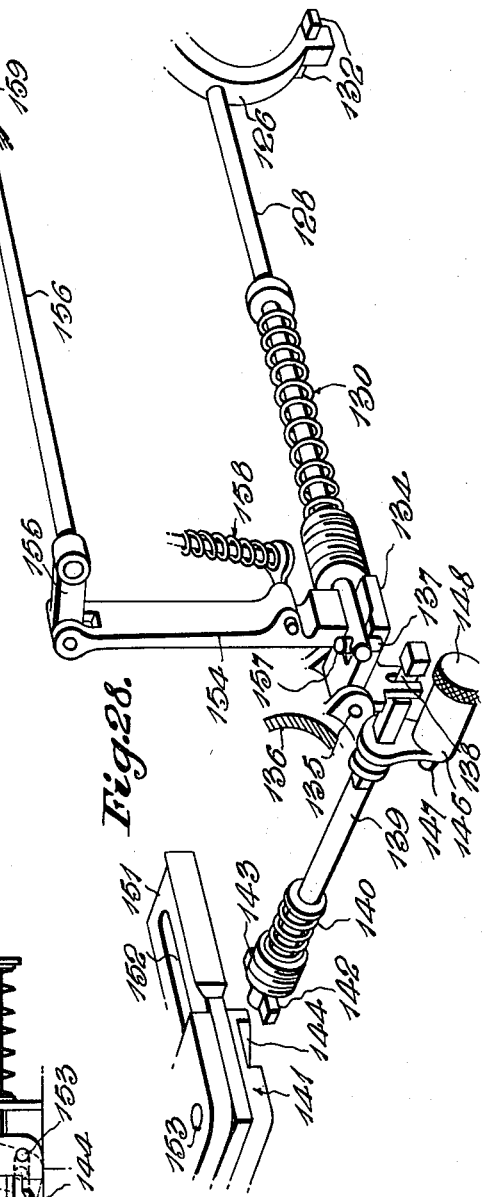
Inventor
BRYAN P. JOYCE
Attorneys

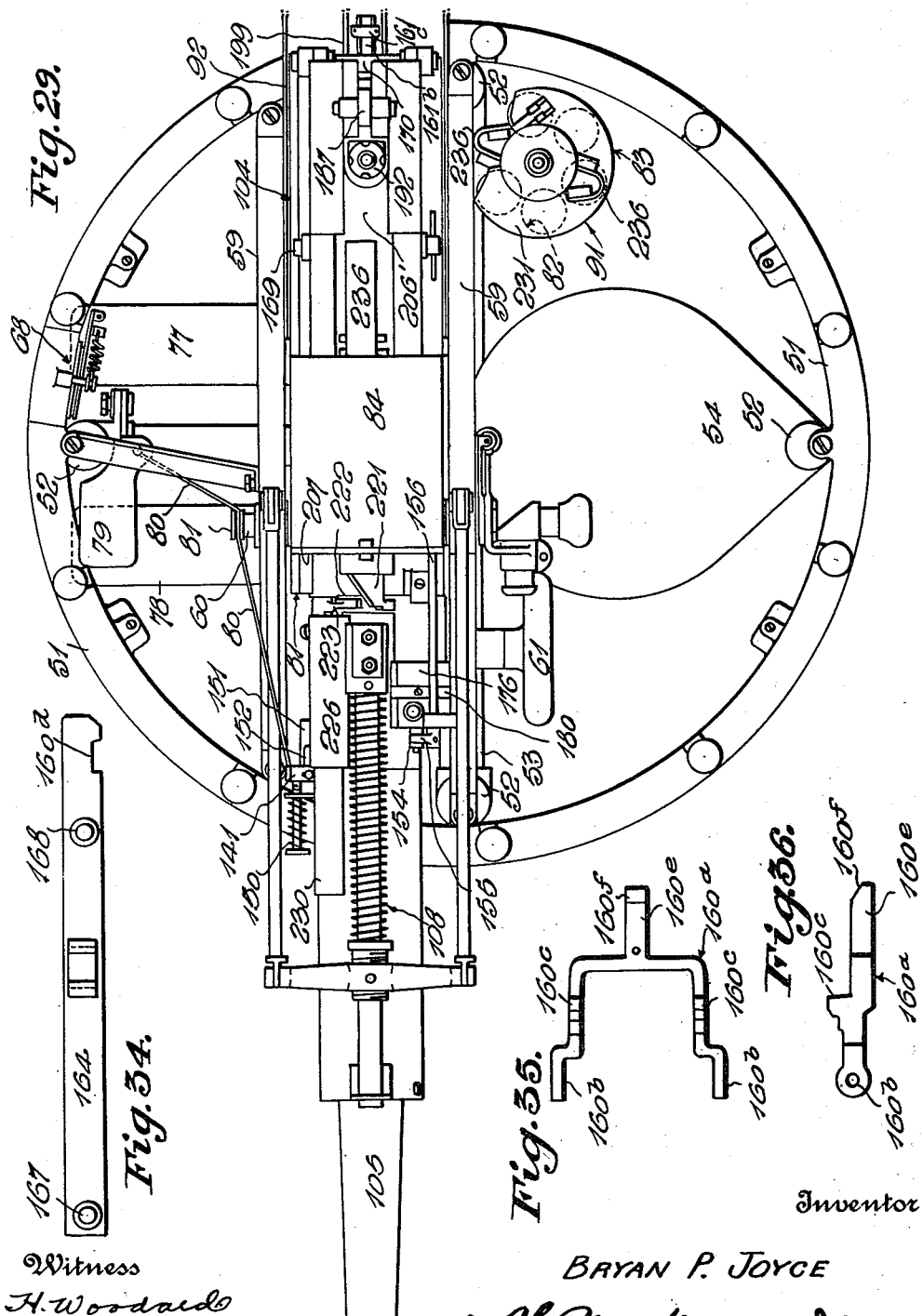

July 5, 1938.  B. P. JOYCE  2,122,423
ROUND FEEDING MECHANISM
Filed Sept. 19, 1935  12 Sheets-Sheet 8
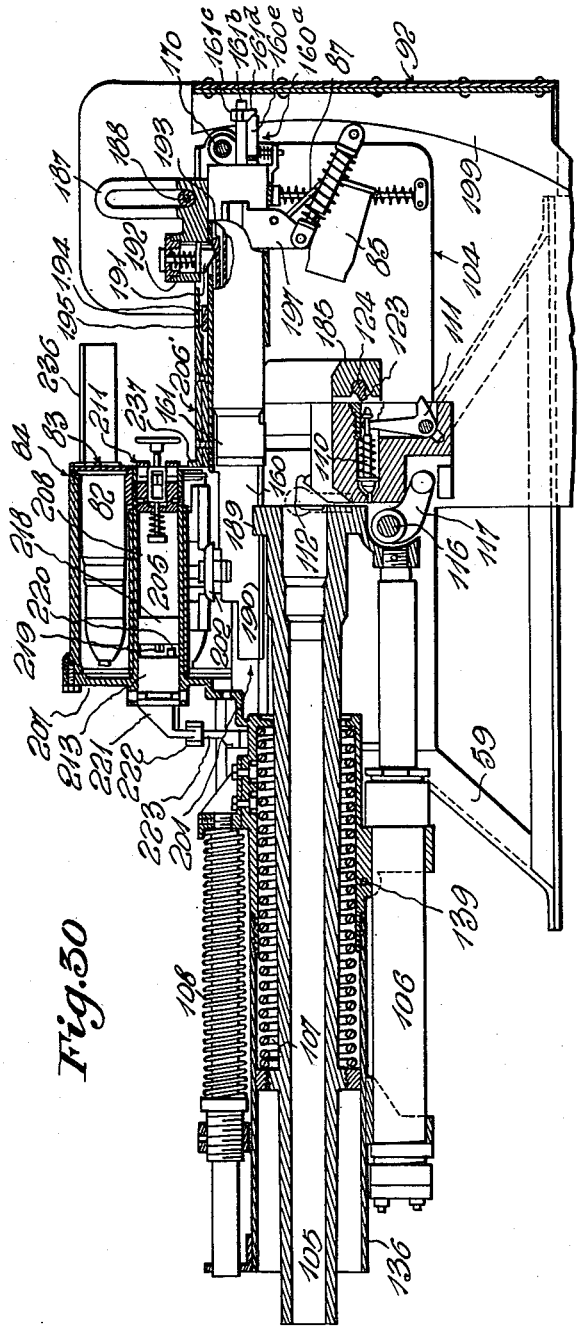
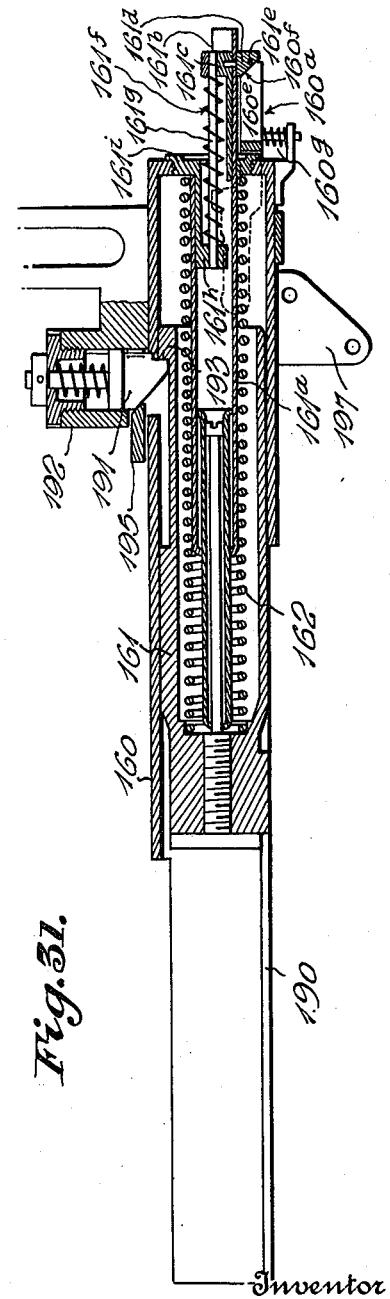
Inventor
BRYAN P. JOYCE July 5, 1938.　　　　　B. P. JOYCE　　　　　2,122,423
ROUND FEEDING MECHANISM
Filed Sept. 19, 1935　　　12 Sheets-Sheet 9

Witness
H. Woodard

Inventor
BRYAN P. JOYCE
By H. B. Wilson & Co.
Attorneys.

July 5, 1938.  B. P. JOYCE  2,122,423
ROUND FEEDING MECHANISM
Filed Sept. 19, 1935  12 Sheets-Sheet 10
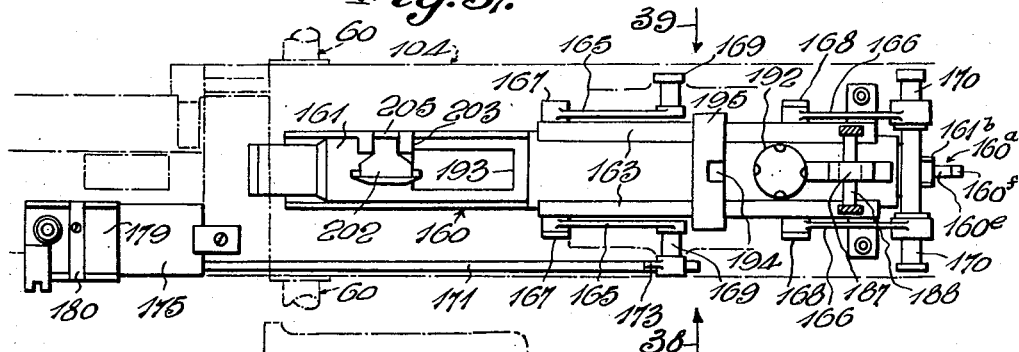
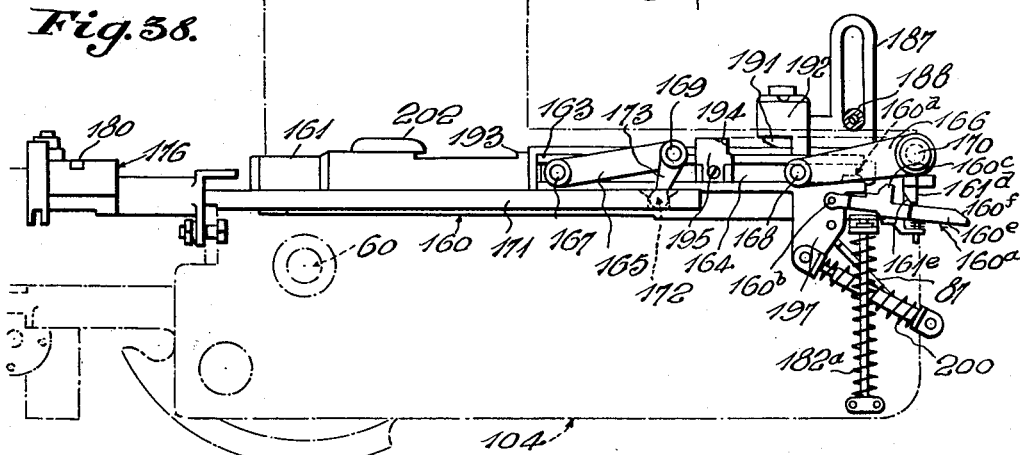
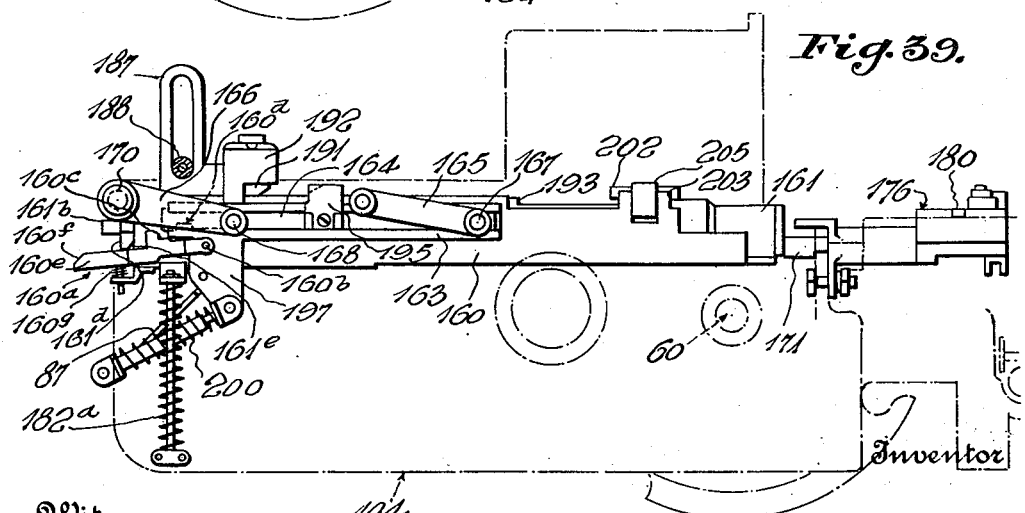
Witness
H. Wordard
Inventor
BRYAN P. JOYCE
By H. B. Wilson & Co.
Attorneys.

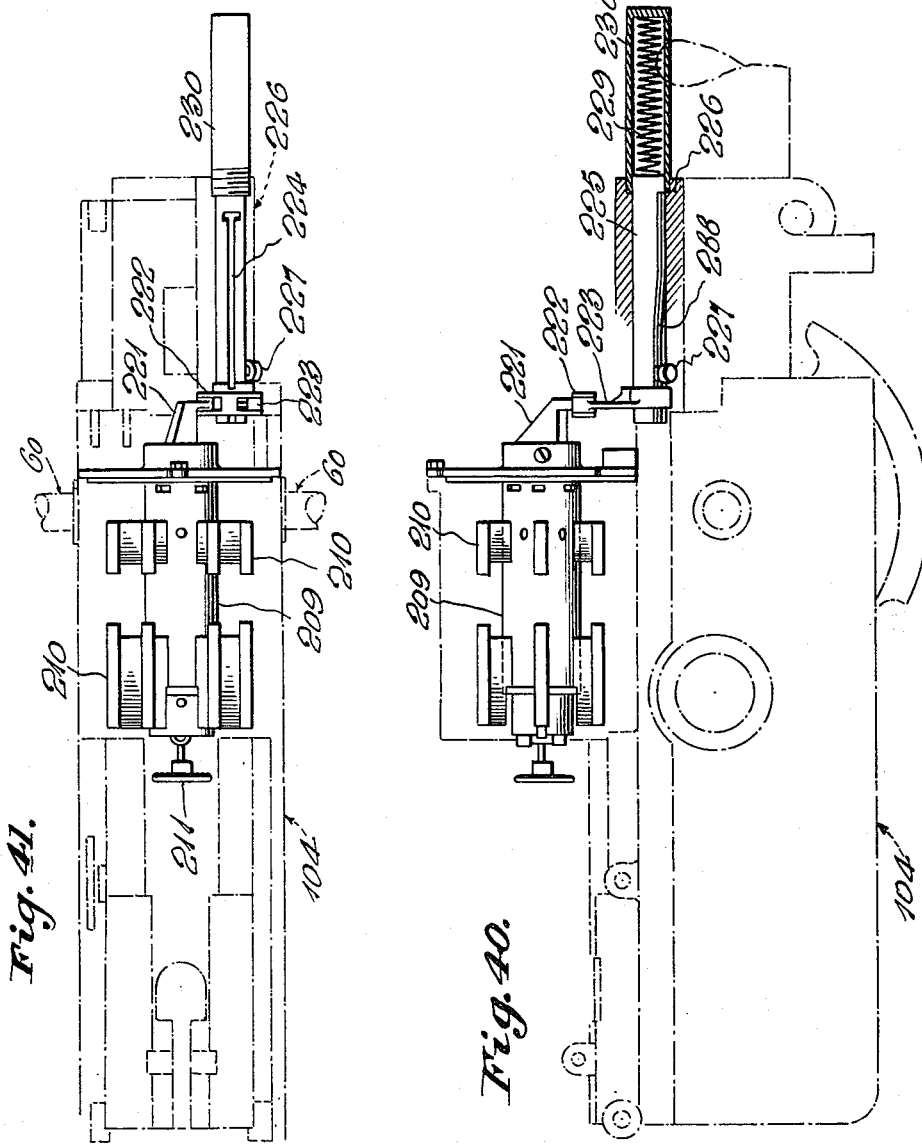

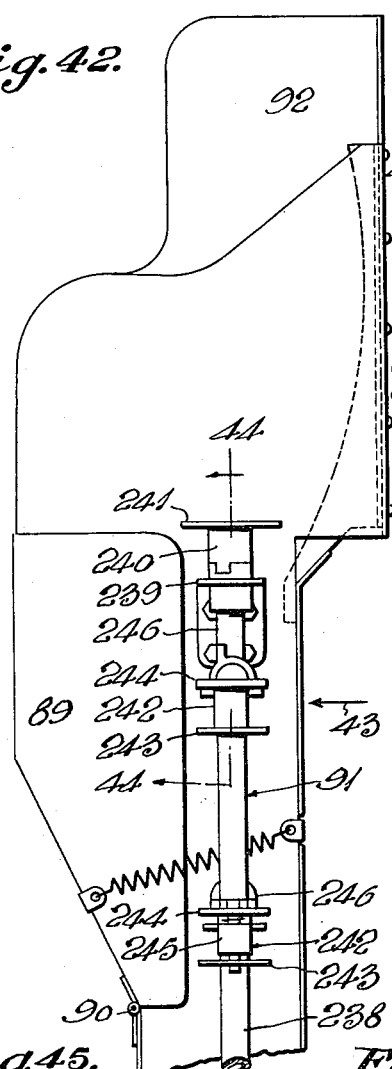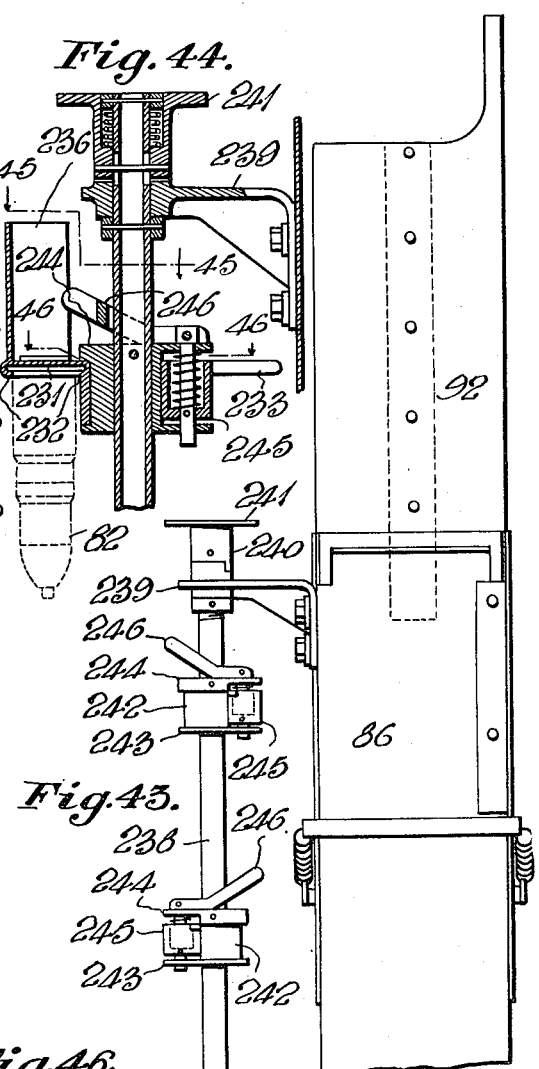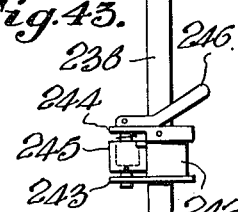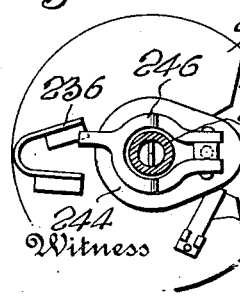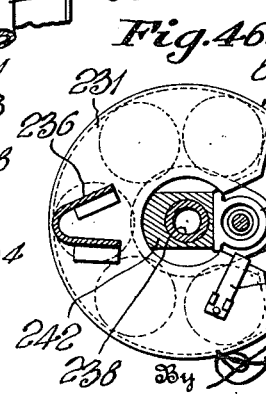
Inventor
BRYAN P. JOYCE

Patented July 5, 1938

2,122,423

UNITED STATES PATENT OFFICE 2,122,423

ROUND-FEEDING MECHANISM

Bryan P. Joyce, East Orange, N. J., assignor to American Armament Corporation, New York, N. Y., a corporation of New York Application September 19, 1935, Serial No. 41,316

23 Claims. (Cl. 89—33)

This application is a continuation in part of my parent U. S. application Serial No. 754,150, filed November 21, 1934.

The invention relates to round feeding mechanism for automatic guns and it aims to provide a novel magazine and actuating means therefor, a novel clip for rounds of ammunition, a novel loading tray and actuating means therefor to move the rounds from the magazine and place them at the breech of the gun, a novel loading plunger to force the rounds from the tray into the gun breech, a novel latch for holding the loading tray in round-placing position, a novel latch for holding the plunger in retracted position until it should act, novel releasing means for said latches, novel provision for preventing firing of the last round discharged from the magazine until a new clip of rounds has been inserted into the magazine, and a light, efficient and desirable mechanism.

With the foregoing and other objects in view which may become apparent as description proceeds, the invention resides in the novel subject matter hereinafter described and claimed, description being accomplished by reference to the accompanying drawings.

Fig. 1 is a perspective view illustrating the general arrangement of parts and showing the gunner in the gunner's basket in readiness for action.

Fig. 2 is a side elevation partly broken away and in section.

Fig. 3 is a vertical longitudinal sectional view partly broken away showing the parts in position for firing, herein referred to as battery position.

Fig. 4 is a front elevation.

Fig. 5 is a side elevation of the loading tray which moves from a raised round-receiving position to a lowered round-placing position to carry the rounds from the magazine to the gun breech in readiness for loading, said tray being shown in its raised position.

Fig. 6 is a view similar to Fig. 5 but showing the loading tray lowered and illustrating the plunger which slides the rounds from the tray into the gun breech, in projected position.

Figures 32, 33:
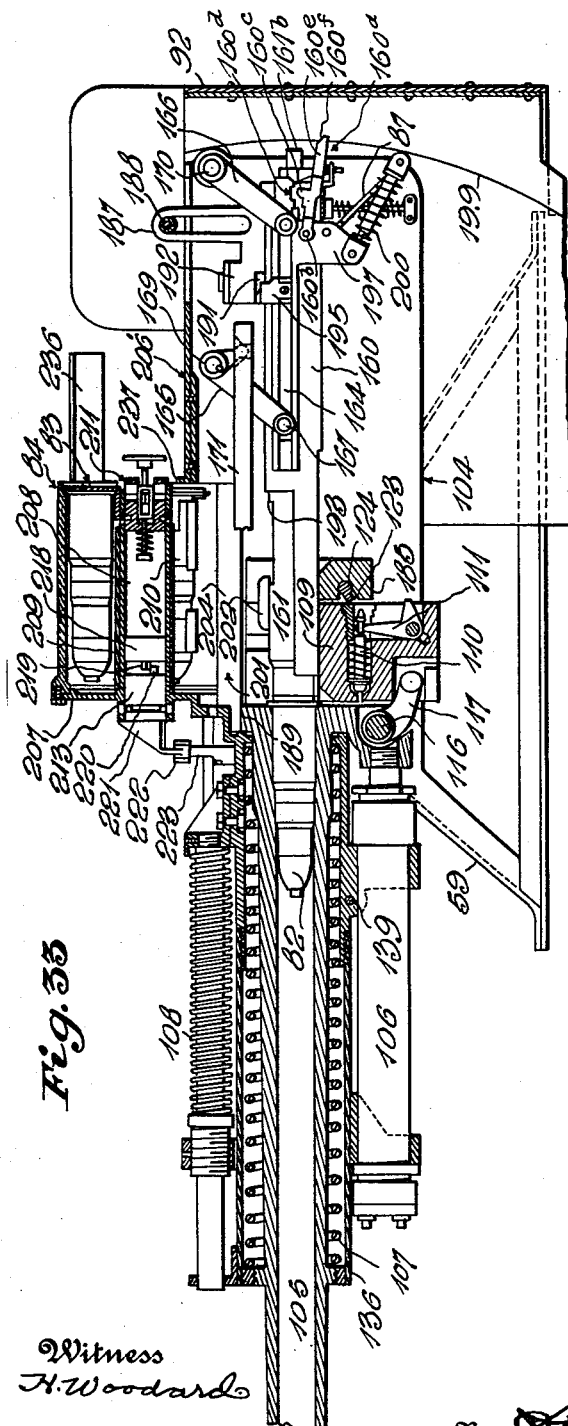

Figs. 7, 8, 9 and 10 are diagrams showing the actuating means for the loading tray. Fig. 7 illustrates this mechanism in battery position; Fig. 8 illustrates the relative positions of the parts of said mechanism when the gun recoils; Fig. 9 shows the relation of parts when counter-recoil has almost terminated; Fig. 10 illustrates the parts returned to battery position.

Fig. 11 is a top plan view partly in horizontal section of the loading tray-actuating mechanism diagrammatically illustrated in Figs. 7 to 10.

Fig. 12 is a side elevation partly broken away and in section showing the same mechanism with the parts positioned as in Fig. 8.

Fig. 13 is a view similar to Fig. 12 but showing the parts in battery position.

Fig. 14 is a vertical transverse sectional view on line 14—14 of Fig. 13.

Fig. 15 is a fragmentary longitudinal sectional view partly in elevation illustrating primarily parts of the firing and magazine mechanisms and parts of the actuating means for the rotary spider which feeds the rounds from the magazine.

Fig. 16 is a vertical transverse sectional view substantially on line 16—16 of Fig. 15.

Fig. 17 is a detail side elevation of the right hand side of the gun showing part of the operating mechanism for the above mentioned rotary spider.

Fig. 18 is a detail end elevation of the parts shown in Fig. 17, viewed from the right hand end of the latter.

Fig. 19 is a vertical sectional view partly in elevation showing more particularly the manner in which the empty shell cases ejected from the gun are deflected into the receiver.

Fig. 20 is a detail rear elevation showing more particularly the deflecting means for the empty shell cases and the loading tray latch.

Fig. 21 is a detail sectional view substantially on line 21—21 of Fig. 15 showing the ratchet pawl constituting part of the mechanism for operating the rotary round-feeding spider of the magazine.

Fig. 22 is a detail sectional view on line 22—22 of Fig. 15 showing the dog which holds the spider in each position to which it is turned by the ratchet pawl.

Fig. 23 is a detail horizontal sectional view on line 23—23 of Fig. 3 showing the latch means for holding the clips in the magazine.

Fig. 24 is a fragmentary side elevation showing part of the actuating mechanism for the firing means.

Fig. 25 is a vertical transverse sectional view on line 25—25 of Fig. 24.

Fig. 26 is a fragmentary side elevation showing parts of the mechanism for actuating and controlling the firing means, viewed as indicated by the arrow 26 of Fig. 25.

Fig. 27 is a bottom plan view of a number of the parts shown in Fig. 24.

Fig. 28 is a perspective view illustrating the principal parts of the mechanism for actuating and controlling the firing means.

Fig. 29 is a top plan view.

Fig. 30 is a vertical longitudinal sectional view showing the relation of the various parts when recoil has terminated and counter-recoil has started.

Fig. 31 is an enlarged central vertical longitudinal sectional view through the loading tray and the loading plunger showing said tray latched in lowered round-placing position and showing the plunger-holding latch about to be released.

Fig. 32 is a view similar to Fig. 31 but showing the tray-holding latch released, the tray again raised to round-receiving position, and the plunger projected.

Fig. 33 is a view similar to Fig. 30 showing the relation of parts as counter-recoil terminates.

Fig. 34 is a side elevation of one of the slide bars with which the tray-holding latch coacts.

Figs. 35 and 36 are respectively a top plan view and a side elevation of the tray-holding latch.

Fig. 37 is a top plan view of the loading tray and parts of its actuating means.

Fig. 38 is a side elevation of the parts shown in Fig. 37 viewed as indicated by the arrow 38 of the latter.

Fig. 39 is a side elevation of the parts shown in Fig. 37 viewed as indicated by the arrow 39 thereof.

Fig. 40 is an elevation partly in section of the right side of the gun showing the actuating means for the rotary round-feeding spider of the magazine.

Fig. 41 is a top plan view of the parts shown in Fig. 40.

Fig. 42 is a detail side elevation showing a portion of the clip rack and the empty shell case receiver by which it is carried.

Fig. 43 is an elevation of the parts shown in Fig. 42 viewed as indicated by the arrow 43 thereof.

Fig. 44 is an enlarged detail sectional view on line 44—44 of Fig. 42.

Figs. 45 and 46 are detail horizontal sectional views on lines 45—45 and 46—46 of Fig. 44.

Fig. 47 is a detail transverse sectional view substantially on line 47—47 of Fig. 5.

Fig. 48 is a horizontal sectional view substantially on line 48—48 of Fig. 14.

The specific construction shown in the drawings will be definitely described with the understanding, however, that within the scope of the invention as claimed, numerous variations may be made, the disclosure being illustrative rather than limiting.

I have shown an annular track 50 (Figs. 1 and 2) to be secured to an aircraft (not shown) around the edge of a cockpit. Partly overlying and partly within and concentric with the track 50, is a rotatable ring 51 from which pipes or other structural members 52 project downwardly, the lower ends of said members 52 being connected by other pipes or structural members 53, so that the ring 51 and the various structural members 52, 53 cooperate in forming a gunner's basket in which an adjustable seat 54 may be provided for the gunner.

Two gun-mounting side frames 59 span the ring 51 and are secured thereto, and the gun is supported on these side frames by trunnions 60 (Figs. 4, 31, 37, 38 and 39) so that said gun may be elevated or depressed as required. A hand wheel 61 is provided to effect turning of the gun about the trunnions 60. The hand wheel 61 is operated by the gunner's left hand, and rigid hand grips 67 are shown projecting outwardly from the track 50 to be engaged by his right hand, so that by pushing or pulling on these hand grips, the gunner may rotate the entire basket and the gun to traverse the latter. 68 merely denotes a brake for the gunner's basket having an actuating pedal 77 (Fig. 1) mounted in the lower end of said basket in position to be engaged by the right foot. A supporting plate 78 may be provided for the left foot as shown in Fig. 1 but when the gun is being operated, this foot engages a firing pedal 79 which is mounted in the gunner's basket and connected with the lower end of a cable 80, the upper end of this cable being connected with a mechanism hereinafter described for effecting either single shot operation of the gun or automatic operation. As shown in Figs. 4 and 29, the cable 80 may be so engaged with a pulley 81 that vertical swinging of the gun will have no tendency to loosen or tighten said cable.

The gun is of a type to receive the rounds shown at 82 in a number of the views, from a clip 83 within a magazine 84, said magazine being shown in most of the main views and the construction of the clip being illustrated primarily in Figs. 44, 45 and 46. The rounds 82 fed from the magazine 84 are automatically loaded into the gun and upon counter-recoil, the empty shell cases 85 are rearwardly ejected. A receiver 86 is provided for the empty shell cases 85, said receiver being fixedly mounted in the gunner's basket as will be clear from views such as Fig. 1 and Fig. 2 and Fig. 19. The gun carries a deflector 87 for properly directing the ejected shell cases into the receiver 86 regardless of the extent to which the gun be elevated or depressed, and said receiver may be provided with downwardly yieldable spring-raised doors 88 (Fig. 19) which prevent accidental emptying of the shell cases therefrom when the aircraft is flying at a severe angle or inverted. The front wall 89 of the receiver 86, above the doors 88, (Fig. 19) may be mounted for forward yielding as shown at 90 when struck by the rear portion of the gun upon severe elevation of the latter.

A rack 91 (see Figs. 1, 2 and 42 to 46) is provided for holding a number of the clips 83 carrying the rounds 82, in the gunner's basket within convenient reach of his right hand, said rack being preferably mounted on one side of the shell case receiver 86. The structure of this rack and the construction of the clips which it holds, will be hereinafter described.

At the upper end of the receiver 86, a guard 92 may well extend around the rear portion of the gun for safety, said guard being preferably of such wind resistance as to balance the wind resistance against the front portion of the gun so that wind pressure will not interfere with easy turning of the gun about its vertical axis.

The trunnions 60 above described support a cradle shown at 104 in a number of the main views, and the gun barrel 105 is slidably mounted in said cradle in any preferred way so that it may recoil and counter-recoil. A recoil check is shown at 106 and a counter-recoil spring at 107, and appropriate counter-poise mechanism may be employed as illustrated in a general way at 108.

The gun barrel 105 is provided with a vertically slidable breech block 109 carrying a conventional firing pin 110 and a bell crank or sear lever 111 connected with said pin. Suitable ejectors 112 are provided to eject the shell cases 85 when the breech block 109 lowers upon recoil of the barrel 105, said ejectors serving also to hold said breech block in lowered position until the next round is loaded into the gun breech. For operating the ejectors 112 and for causing them to temporarily lock the breech block 109 lowered, studs 113 are provided on the ejectors mounted in slots 114 in the breech portion of the gun and operable in grooves 115 in the sides of the breech block (see Fig. 19). I have not gone into any particular detail with regard to these structural features, for they are known.

The rear portion of the gun barrel carries a transverse rock shaft 116 having an arm 117 connected with the breech block 109, for lowering and raising said breech block, one end of said shaft 116 being preferably squared as seen in Fig. 15 to be engaged by a hand crank or the like, if desired. The other end of shaft 116 is provided with an operating arm 118 (Figs. 15 and 16) which is cooperable with a known one-way dog 119 (Figs. 15 and 16) to lower the breech block 109 after recoil has occurred and counter-recoil has started. Upon recoil of the gun barrel, the arm 118 merely swings the dog 119 out of its way as shown in dotted lines in Fig. 15 but upon counter-recoil, dog 119 operates arm 118 to turn shaft 116 and lower the breech block. When this occurs, the ejectors 112 eject the empty shell case 85 and then serve to hold the breech block lowered until a new round is inserted.

Suitably connected with the shaft 116 is the chain of an assemblage of chain 120, piston 121, and spring 122. When the breech block 109 lowers, the chain 120 is pulled, causing movement of the piston 121 to compress the spring 122. As soon as the breech block is released by insertion of a round into the gun barrel, spring 122 expands and moves piston 121 and chain 120 to again raise the breech block. During this raising, the bell crank or sear lever 111 coacts with a nose 123 on a trigger shaft 124 to retract the firing pin 110 as shown in Fig. 3. If the gun be set for manual control as hereinafter described, the firing pin 110 will remain retracted until the gunner depresses the firing pedal 79 but if the gun be set for automatic operation, said firing pin will be released as soon as the breech block 109 is entirely closed. The trigger shaft 124 is provided on one end with a trigger arm 125 which is in the rearward path of an arm 126 (Fig. 15), said arm 126 being loosely pivoted at 127 to the left side of the breech portion of the gun barrel. The rear end of a longitudinally extending rod 128 abuts the arm 126 (see Figs. 15, 25, 26 and 28), said rod 128 extending forwardly through a suitable guiding casing 129 and being provided with a spring 130, said spring being operable to rearwardly force said rod 128 to effect firing of the gun, after said rod is forwardly forced to compress spring 130 and then released. In order to force this rod 128 forwardly to compress the spring 130, I show the piston 121 with an upward projection 131 and locate the lower end of the arm 126 in the forward path of said projection, as will be clear from Figs. 15 and 16. When the breech block 109 is lowered and the piston 121 is consequently pulled forwardly, the projection 131 swings the arm 126 forwardly and when counter-recoil has almost been completed, said arm 126 contacts with rod 128 forcing it forwardly and compressing spring 130. If the gun be set for manual operation, the rod 128 will remain in its forward position due to the latching means hereinafter described, but if the gun be set for automatic operation, just as soon as the breech block closes and arm 126 is no longer held by the projection 131 of piston 121, spring 130 actuates the rod 128, causing the arm 126 and trigger arm 125 to operate to release the firing pin 110. Obviously, as long as the breech block is open and the arm 126 is held by the projection 131 of piston 121, said arm 126 cannot swing rearwardly to actuate the trigger arm 125 and there is therefore no danger of the firing pin being released while the breech block stands open.

The lower end of arm 126 is shown as provided with lateral lugs 132 to abut suitable stops 133 (Fig. 15) to limit the forward movement of said arm.

A latch 134 (Figs. 2, 25, 26 and 28) is provided for coaction with the rod 128 to hold the latter against movement under the influence of the spring 130 after said rod has been forwardly moved to compress said spring, but this latch 134 is permitted to function only if the gun is being manually instead of automatically fired. If manual firing is to be effected, the latch 134 is allowed to hold the rod 128 in the forward position shown in Figs. 26 and 28, until firing is to be accomplished. Then, the release of latch 134 will allow rod 128 to move rearwardly under the influence of the spring 130, tripping the firing mechanism as above explained. If the gun is being automatically operated, the latch 134 is held in released position so that after each forward movement and release of rod 128, spring 130 will rearwardly slide said rod as soon as the breech block closes.

In the present showing, the latch 134 is in the form of an inverted L pivotally mounted at 135 upon the portion 136 of the cradle which contains the counter-recoil spring 107, and the horizontal arm of said latch is co-operable with a downwardly projecting stud 137 on the front end of rod 128. The vertical arm of the latch 134 is pivotally connected at 138 with a shaft 139 (Figs. 24, 25, 26 and 28), said shaft passing rotatably through a portion of the barrel 136 and being also slidable. Pulling the shaft 139 in one direction releases the latch 134 and compresses a spring 140 which surrounds said shaft. A slidable member 141 connected with the cable 80 above described, is provided for pulling the shaft in latch-releasing direction and then releasing said shaft if manual firing is to be effected, or for pulling said shaft to latch-releasing position and holding it in this position if automatic firing is to be carried out. The member 141 is provided with one cam portion 144 for coaction with the lug 142 when manual firing is to be effected, and is provided with another cam portion 145 for coaction with the long lug 143 when the gun is to fire automatically, and the shaft 139 may be turned by means of a crank 146 to dispose either of said lugs in operative relation with the member 141 or to so locate said lugs that neither one of them can be engaged by said member 141. A latch pin 147 is slidable in the handle of the crank 146 and is releasable by a knob 148, said latch pin being used for holding the shaft 139 in any one of its three positions. When this shaft is set as shown in Figs. 24 and 25, each time the member 141 is pulled by the cable 80, the cam portion 144 engages the short lug 142, pulling the shaft 139 to release the latch 134, allowing firing of the gun, and just as soon as the latch has been released, said cam portion 144 releases the lug 142 and spring 140 returns said shaft 139, so that latch 134 is in readiness to again hold rod 28 when this rod is again forced forwardly. For manual firing, the operator, of course, releases the foot pedal 79 after the shot has been fired, whereupon a spring device 150 returns the member 141 to its normal position.

When the shaft 139 is turned to place the long lug 143 in operative relation with the cam portion 145 of the member 141, the gunner will depress the foot pedal 79 and hold it depressed. This causes the cam portion 145 of member 141 to engage lug 143, slide shaft 139 to release latch 134 and hold this latch in released position so that rod 128 may rearwardly return each time it is forced forwardly, thus effecting automatic firing. When shaft 139 is set in a neutral position, operation of member 141 cannot effect movement of said shaft.

The member 141 is of the L-shape shown in Fig. 27, being bifurcated to straddle a fixed track 151 which is suitably secured to the gun cradle, said track 151 having a longitudinal slot 152 which receives a pin 153 carried by the member 141. This member 141 is thus effectively guided and is allowed a tilting movement as shown in dotted lines in Fig. 27. This tilting movement is necessary in order to allow member 141 to pass the end of shaft 139 carrying the lugs 142 and 143 as member 141 is returned to its normal position by the spring device 150, said member 141 then clicking idly over said lug 142.

A pivotally supported lock 154 is provided, capable of positively locking the rod 128 in gun-cocked position. In the present showing, this lock is in the form of an arm pivotally suspended from a crank arm 155 on a longitudinal shaft 156 which extends along the left side of the magazine 84 and projects forwardly from it as seen more particularly in Figs. 2 and 28. When the lock or arm 154 is in lowered position as seen in the views just mentioned, it is in the rearward path of an upward projection 157 on the front end of rod 128 and this rod is therefore held against movement in gun-firing direction. A spring device 158 is provided to move the lock 154 downwardly when permitted to do so, and a feeler 159 on the rear end of shaft 156 is provided for co-action with the rounds 82 in the magazine 84 to prevent said lock from holding the rod 128 until the last round from the magazine has been loaded into the gun. When this last round has been loaded however, feeler 159 permits spring 158 to depress lock 154 to the position shown most clearly in Figs. 26 and 28, thereby holding the rod 128 so that the round cannot be fired. The empty clip is now removed from the magazine 84 and a new clip is inserted, and one of the rounds of this new clip will engage the feeler 159 and it will release the lock 154 so that operation of the gun may continue either automatically or manually controlled. If the last round from the magazine were fired after insertion into the barrel breech, further automatic operation could not be effected upon insertion of a new clip, without first loading the gun by hand. Such hand loading however, is not required by leaving one unfired round in the gun, as above described.

When the gun has been automatically operating and the last round is loaded into it, the gunner of course releases the foot pedal 79 before inserting a new clip of rounds into the magazine 84. This insures that by the time the lock 154 is released, latch 134 will be in position to hold the rod 128 against movement in gun-firing direction. Otherwise, the rod 128 would effect gun firing immediately upon insertion of a new clip and consequent release of lock 154.

A loading tray 160 (Figs. 3, 5, 6, 15, 16, 30, 33, 37, 38 and 39) is provided for moving the rounds from the magazine 84 and placing them one at a time in position to be forced into the breech of the barrel, and a telescopic plunger 161 provided with an operating spring 162, is slidably mounted in said tray 160 for forcing the rounds from the tray into the breech. The opposite sides of the tray 160 are provided with longitudinal channel-shaped guideways 163 shown in elevation in a number of the views just referred to and illustrated in transverse section in Fig. 47. Two slide bars 164 are slidably mounted in the guideways 163, and the lower ends of front and rear parallel arms 165 and 166 are pivoted to said bars at 167 and 168 respectively, the upper ends of these arms being pivotally mounted on the cradle 104 as denoted at 169 and 170 respectively. A longitudinal operating bar or rod 171 (Figs. 2, 7 to 13, 33, 37 and 38) is pivotally connected as at its rear end with one of the arms 165. In the present showing, this bar or rod 171 is pivoted at 172 to the lower end of a short arm 173 which is connected with the left arm 165 to move bodily therewith through the instrumentality of the pivot 169 of this arm. The bar or rod 171 is slidable in a guideway 174 formed in the left side of the cradle 104 as seen in elevation in Fig. 2 and in transverse section in Fig. 16. The front end of the bar or rod 171 is provided with a rack bar 175 which is slidable in a casing 176 rigidly mounted on the cradle 104 at the front end of the guideway 174. For this rack bar and associated features now to be described, see more particularly Figs. 7 to 14 inclusive and Fig. 48. This back bar 175 meshes with a pinion 177 which is rotatably carried by a slide 178 mounted in the casing 176. In the present showing, this casing includes a removable upper section 179 slidable from the major portion of said casing but normally held in place by a key 180. Also slidable in the casing 176 is another rack bar 181, the rear end of which is denoted at 181' for future reference. A spring 182 in the casing 176 urges the rack bar 175 and the bar or rod 171 forwardly and another spring 183 exerts a rearward pressure on the rack bar 181. When spring 183 is allowed to slide the rack bar 181 rearwardly to the position shown in Figs. 8, 11, 12 and 48, said rack bar causes the pinion 177 to roll rearwardly along the rack bar 175, said pinion thus causing rearward sliding of the slide 178. A spring-lowered latch 184 is mounted in the casing 176 to lower and hold the slide 178 in its rearward position as seen in Figs. 8, 11 and 12. Thus, when the rack bar 181 is pushed forwardly, the pinion 177 will rotate and will rearwardly slide the rack bar 175, thus rearwardly pushing the bar or rod 171 to downwardly swing the arms 165 and 166, lowering the loading tray 160 from its raised round-receiving position (Figs. 5, 30, 38 and 39) to its lowered round-placing position (Figs. 6 and 33). When the tray 160 reaches this lowered position, it is temporarily held by a latch 160ᵃ and while so held the plunger or ram 161 which was previously moved to the position of Fig. 30, forces the round 82 from the tray 160 as seen in Fig. 33. Latch 160ᵃ is released as the plunger or ram forces the round from the tray. This latch and its releasing means will be hereinafter described in full.

The rear end 181' of rack bar 181, when the gun is in battery position, abuts a part of the breech portion of the gun barrel, said part being the front end of the breech portion 185 in which the breech block 109 is slidably mounted (see Figs. 15 and 16). By means of this part 185, the rack bar 181 is held in the forward position shown diagrammatically in Fig. 7. When the gun is fired and the barrel recoils, the barrel portion 185 moves rearwardly from the end 181' of rack bar 181 and the spring 183 then expands, forcing rack bar 181 rearwardly to the position shown in Fig. 8 and causing rearward rolling of pinion 177 along rack bar 175. This causes rearward movement of the slide 178 and when this slide reaches the limit of its rearward movement, the spring-pressed latch 184 lowers to hold said slide against forward return as seen in Fig. 8. During the last portion of the counter-recoil of the gun barrel, the part 185 again strikes the end 181' of rack bar 181, pushing this rack bar forwardly from the position of Fig. 8 slightly beyond the position disclosed in Fig. 9. During this movement of rack bar 181, the pinion 177 is driven by said rack bar, said pinion forcing rearwardly on the rack bar 175 and rearwardly sliding the rod or bar 171 to lower the loading tray 160. When this tray is completely lowered, it is held by latch 160ª until the plunger or ram 161 releases this latch. A cam 186 on the rack bar 181 releases the latch 184, freeing the slide 178 and allowing spring 182 to forwardly slide the rod or bar 171, thereby again raising the loading tray 160 into position to receive the next round, as will be clear from Fig. 10. Additional springs 182ª acting upwardly upon the rear of the tray 160 may be provided to aid spring 182. To confine the loading tray to vertical movement as the arms 165 and 166 swing, any suitable means may be provided, such as the upstanding guide 187 on the rear end of said tray and the relatively stationary pin or the like 188 passing through said guide and suitably mounted on the cradle 104.

When the loading tray 160 is returned to its raised position, the plunger 161 is in projected position as seen in Fig. 3. A lug 189 however on the rear portion of the gun barrel (see Figs. 3, 16 and 30) is rearwardly movable in a slot 190 in the bottom of the tray 160 as the barrel recoils, to rearwardly telescope said plunger 161 to the position shown in Fig. 30. A spring-pressed latch 191 is mounted in a suitable housing 192 carried by the rear end of the tray 160 to engage a shoulder 193 on the foremost section of the plunger to hold this plunger in the telescoped position shown in Fig. 30 until the tray 160 has lowered a round and placed it at the breech of the barrel. For then releasing the latch 191 and allowing the plunger 161 to expand to the position of Fig. 33 to load the gun, I provide a latch-releasing cam 194 (see Figs. 3, 5, 6, 30, 33, 37 to 39 and 47), said cam being carried by the center of an arched bar 195 which extends over the tray 160 and has its ends rigidly secured to the slide bars 164. It will be recalled that these slide bars move rearwardly as the loading tray 160 lowers, and it will be clear from Figs. 6 and 33 that when said tray 160 has reached its lowered round-placing position (Fig. 33), and has been held therein by latch 160ª, the cam 194 will release latch 191, allowing spring 162 to project the plunger 161, thereby moving the round 82 from the tray 160 into the gun breech. Projection of this plunger 161 releases latch 160ª and when this has occurred, springs 182 and 182ª again effect raising of the tray 160, the breech block 109 closes and the gun either automatically fires or may be caused to fire manually. In either instance, the next recoil of the barrel causes lug 189 to re-telescope plunger 161 to the position shown in Fig. 30 so that the loading tray 160 is in condition to receive another round 82 from the magazine 84.

The latch 160ª is of U-shape and straddles the rear portion of the tray 160, the ends of said latch being pivoted at 160ᵇ to lugs 197 which project downwardly from said tray and carry the deflector 87 and spring devices 200 instrumental in holding said deflector engaged with a track 199. The side arms of the latch 160ª are provided with lugs 160ᶜ to engage notches 160ᵈ in the slide bars 164 when these slide bars move rearwardly upon lowering of the tray 160 to round-placing position, thereby holding said slide bars against the necessary forward movement incident to tray raising and therefore holding said tray in lowered round-placing position until released. The intermediate portion of latch 160ª is provided with a rearwardly projecting arm 160ᵉ having a beveled extremity 160ᶠ, and a spring 160ᵍ acting upwardly on said arm, serves to move the latch to operative position. One section 161ª of the plunger 161 projects rearwardly at 161ᵇ and carries an upper lug 161ᶜ and a lower lug 161ᵈ, the latter having a beveled end 161ᵉ cooperable with the beveled end 160ᶠ of an arm 160ᵉ to release the latch 160ª when said plunger section 161ª moves forwardly upon the final forward movement of the plunger 161. The section 161ª is held against premature latch-releasing forward movement by a spring 161ᶠ. This spring bears against the lug 161ᶜ and surrounds a guide rod 161ᵍ which is secured to and projects forwardly from the lug 161ᶜ, said guide rod 161ᵍ passing slidably through a guide 161ʰ which abuts the spring 161ᶠ and is carried by a screw plug 161ⁱ in the rear end of the plunger 161, said plug being apertured to allow the rear end 161ᵇ of the plunger section 161ª to pass therethrough.

When the tray 160 is lowered to round-placing position, it is held by the latch 160ª until the plunger 161 has forced the round well into the breech of the gun, and the final movement of said plunger causes the lug 161ᵈ to engage arm 160ᵉ swinging the latch 160ª downwardly and releasing its lugs 160ᶜ from the slide bar notches 160ᵈ, allowing return of the tray 160 to raised position in readiness to receive another round from the magazine.

The casing of the magazine 84 is cylindrical with its axis disposed longitudinally of the gun and the lower side of this casing is formed with an exit slot 201 through which the rounds 82 are fed to the loading tray 160, said slot being shown more particularly in Figs. 16 and 33. One side of this slot is cooperable with a finger 202 (Fig. 16) to cause said finger to hold the rounds in the tray 160 during the rapid descent of the latter, said finger 202 being pivoted at 203 on said tray 160 as shown in a number of the views in which said tray is illustrated. The finger 202 (see Fig. 16) may swing upwardly as a round is fed under it, through the slot 201 and into the tray 160 and even if said finger should remain in its upwardly swung position, as soon as the tray starts downwardly, said finger is righted and held in operative position by the edge wall 204 of the slot, with which a lug 205 on the pivoted end of the finger coacts.

The cylindrical side wall of the magazine casing may well be integral with the top 206 of the cradle 104 but the front end wall 207 of said casing is preferably a separate piece bolted on. This wall 207 rigidly carries a tubular shaft 208 which is disposed within and co-axially with the magazine casing. A tubular hub 208 of a spider 210 (see for instance Figs. 15, 16, 21 and 22) is rotatable upon the tubular shaft 208, the spider arms being receivable between the rounds 82 held by the clip 83, one of the clip-held rounds being shown in the magazine in Fig. 3.

The rear end of the tubular shaft 208 contains suitable latch means 211 (see Fig. 23) for holding the clip 83 in the magazine and for preventing rotation of said clip while the rounds 82 are being fed from said clip and on into the loading tray. The front end of the shaft 208 contains a spring-pressed ratchet pawl 212, carried by an oscillatory plug 213, as shown more particularly in Fig. 21. The pawl 212 operates through a slot 214 in the shaft 208 to engage openings 215 in the spider hub 209 for the purpose of rotating the latter step-by-step as required. Other openings 216 (Fig. 22) are formed in the hub 209 and these openings are co-operable with a spring-pressed dog 217 for the purpose of holding the spider 210 after each turning movement thereof. The dog 217 is mounted in a plug 218 secured in the tubular shaft 208 and said dog is provided with a lateral finger 219 cooperable with a cam 220 on the plug 213, said cam and finger serving to release the dog 217 at the proper time to allow the ratchet pawl 212 to turn the spider 210, and then serving to permit engagement of said dog with the next opening 216 to properly hold said spider in the position to which it has been turned.

The oscillatory plug 213 is provided with a crank arm 221 (see more particularly Figs. 4, 40 and 41), said arm 221 being connected by a link 222 with an actuating arm 223. This actuating arm is slidably keyed at 224 to a shaft 225 which is mounted for rotation and for sliding in a suitable tubular bearing 226 carried by the cradle 104 directly in advance of the magazine. The bearing 226 carries a stud 227 which engages a pitched cam groove 228 in the shaft 225, for turning this shaft in one direction when the shaft is slid rearwardly and for turning said shaft in the other direction when said shaft is slid forwardly. This turning of shaft 225 causes the arm 223, link 222 and arm 221 to oscillate the plug 213 causing the ratchet means to turn the spider 210 in the proper direction.

The rear end of the shaft 225, when the gun is in battery position, abuts the front end of the barrel portion 185 in which the breech block 109 is slidably mounted, a spring 229 which abuts the front end of said shaft being then under compression. This spring 229 is within a suitable tubular housing 230. See for instance Figs. 17 and 40. Upon the recoil of the gun barrel, the spring 229 slides the shaft 225 rearwardly and the stud 227 and cam groove 228 then turn said shaft in one direction, causing the ratchet pawl 212 to move retrogradely to release dog 217 and engage one of the openings 215 in the spider hub 209. When the barrel counter-recoils, it pushes the shaft 225 forwardly, turning said shaft in the other direction and causing the ratchet pawl 212 to turn the spider 210 to the proper extent for feeding one of the rounds 82 into the raised loading tray 160. When the plug 213 has been turned sufficiently, its cam 220 releases the finger 219 of the dog 217 and the latter is therefore in readiness to enter the next opening 216 which arrives under it, so that the spider 210 will be held in the position to which it has been turned.

The construction of the clip 83 will be clear by reference to Fig. 23 and Figs. 44, 45 and 46. This clip consists primarily of a substantially C-shaped flat plate 231 having inturned flanges or the like 232 along its inner and outer edges to provide a channel to engage the usual ribs on the rear ends of the shell cases. One end of this channel is provided with a closure 233 (Figs. 44 and 46) and the other end of said channel is provided with a resilient gate 234 (Fig. 46). The inner side of the plate 231 is equipped with an arcuate flange 235 extending around the inner edge of said plate and the outer side of said plate is provided with a suitable handle 236. By means of this handle, the clip may be taken from the rack 91 and inserted into the magazine, in which it is held by the latch means 211 above described. When the round-carrying clip is inserted into the magazine, the gate 234 strikes a projection 237 carried by a cover plate 208' for the rear portion of cradle 104, so that said gate is released and held in released position, said projection 237 being shown in Figs. 1, 30 and 33. With the gate so released, the spider 210 can slide the rounds one at a time from the clip and when one clip is empty, it is removed and another inserted.

The clip rack 91 includes a vertical shaft or rod 238 (see more particularly Figs. 42 to 46) which is rotatably mounted in appropriate brackets, one of which is shown at 239. The upper end of the shaft or rod 238 is provided with a spring-lowered latch member 240 which is slidably pinned thereon and is formed with a knob 241. By raising and turning this knob, the shaft or rod 238 may be turned. Secured upon this rod at vertically spaced points are a number of supporting bodies 242 for the clips 83, said bodies being straddled by the C-shaped plates 231 and the similarly shaped flanges 235. Each body 242 is provided with a lower flange 243 and with an upper flange 244 to engage the clip and hold it against vertical movement, and each of said bodies is equipped with a spring-lowered latch member 245, the various latch members being adapted to engage the clips 83 as seen more particularly in Fig. 46 to hold said clips upon the rack. Releasing levers 246 are provided for these latch members 245. These levers 246 are so located with respect to the clip handles 236 that the gunner may operate the releasing lever for any clip with the hand which he uses to grasp the handle 236 for removing the clip from the rack.

The bodies 242 are so mounted on the pipe or rod 238 that the handles 236 of the clips are nested with the rounds held by said clips. The handle of the uppermost clip for example, would be to the left of the rod or the like 238 in Fig. 43, the next clip would have its handle to the right of said rod or the like, the next clip handle would be to the left, etc. To bring the handle of any clip to an accessible position, the rod or the like 238 may be rotated by means of the knob 241 after lifting said knob to release the latch 240, the knob being then released to cause said latch to again lock the rod or the like 238. The uppermost clip is removed first, the rod then turned one-half revolution, the next clip removed, and so on until all of the clips have been fired.

While the operation of the structure as a whole would probably be understood from explanations hereinbefore given in connection with the various groups of coacting elements, it may be briefly explained as follows:—The initial round is, of course, inserted by hand by manually lowering the breech block 109 with a crank or the like applied to the squared end of the shaft 116. Lowering the breech block pulls upon chain 120, compressing spring 122 and moving piston 121 (see Fig. 15) forwardly. The projection 131 on this piston swings the arm 126 forwardly thereby moving the rod 128 to gun-cocked position and compressing the spring 130. We will now assume that the crank 146 (Figs. 26 and 28) has been moved upwardly and forwardly to the "one shot" position so that the latch 134 will hold the rod 128 in its forward gun-cocked position. After inserting the first round by hand, the breech block is allowed to close under the influence of the spring 122 and as said breech block closes, the bell crank 111 and finger 123 coact to retract the firing pin 110 and hold it retracted as seen in Fig. 3. Depression of the firing pedal 79 will now pull cable 80 and actuate the member 141 to pull the shaft 139 in a direction to release the latch 134, allowing rod 128 to slide rearwardly under the influence of spring 130 to trip the firing pin 110 to fire the round. It is to be recalled that at this time, the lock 154 is held in released position by one of the rounds in the magazine contacting with the feeler 159, so that said lock will not interfere with rearward sliding of the rod 128. As soon as the round is fired, recoil of the barrel occurs, causing the breech portion 185 of said barrel to recede from the end 181' of the rack bar 181 and from the shaft 225. Release of the rack bar 181 causes the entire actuating means for the loading tray 160 to move to the set position shown in Fig. 8, under the influence of the spring 183. Release of shaft 225 causes spring 229 to slide said shaft rearwardly, setting the ratchet mechanism in the magazine 84 in readiness to turn the spider 210. The recoil of the barrel also causes the projection 189 to telescope the plunger 161, and the latch 191 holds it in the telescoped position, as seen in Fig. 30. As the barrel slides rearwardly during recoil, the breech block-operating arm 118 moves idly past the dog or the like 119 and as counter-recoil occurs, said parts 118 and 119 turn the shaft 116 to lower the breech block 109 causing the ejectors 112 to eject the empty shell case 85 and causing the studs 113 to hold said breech block lowered. This lowering of the breech block again engages the rod 128 with the latch 134. As counter-recoil continues, the shaft 225 is again slid forwardly causing such movement of arm 223 and connected parts as to turn the spider 210 sufficiently to feed a round from the magazine into the raised loading tray 160 in advance of the telescoped plunger 161. As counter-recoil continues, the rear end 181' of the rack bar 181 is forwardly pushed with the result that rearward sliding of the rod or bar 171 is effected, said bar then serving to lower the loading tray 160 to the round-placing position shown in Fig. 33. When this position is reached, the tray is held by latch 160ᵃ. Then, the cam 194 releases the latch 191 and the plunger 161 is forwardly projected by means of the spring 162, forcing the round 82 from the tray 160 into the breech of the gun. By the time this occurs, latch 160ᵃ is released by lug 161ᵈ, and the springs 182 and 182ᵃ act to again effect raising of the loading tray 160, and it will be recalled that insertion of the round 82 into the breech so moves the ejectors 112 as to release the breech block 109. This breech block is then immediately closed by means of the spring 122 and associated parts, and during the closing movement of said breech block, the firing pin 110 is retracted and held retracted. The gun is now in readiness for firing the second shot, the various parts having been returned to battery position.

If the crank 146 be set for automatic operation, the gunner depresses the firing pedal 79 and holds it depressed so that the member 141 will hold the shaft 139 and in turn hold the latch 134 in released position. With this latch so held, it cannot hold the rod 128 the next time the latter is forced forwardly by arm 126, but said rod 128 is then held against rearward movement by said arm 126 and the piston portion 131. Consequently, just as soon as the breech block is closed after the automatic loading of the round into the breech, the rod 128 will be slid rearwardly by the spring 130 causing arm 126 to strike the trigger arm 125, releasing the firing pin 110 and firing the round. The gun will now operate automatically as long as the firing pedal 79 is held depressed until the last round from the magazine 84 has been loaded into the breech. When this has occurred, however, the lock 154 automatically prevents firing of this last round until the magazine is reloaded.

Whether the gun is being operated in a single shot manner or automatically, all of the ejected shell cases are directed into the receiver 86 by the deflector 87.

The gunner may easily elevate or depress the gun by operating the hand wheel 61, he may conveniently rotate the entire basket and gun to traverse the latter by engaging the hand grips 67 with his right hand, and the basket may be held in any position to which it has been rotated by depressing the brake pedal 77. The clips on the rack 91 are within convenient reach and the gunner may rapidly remove an empty clip from the magazine, remove a full clip from said rack, and insert this clip into the magazine. Such insertion causes the feeler 159 to release the lock 154 so that operation of the gun may be continued.

Whenever desired, the crank 146 may be set in its neutral or safe position so that any movement which may be imparted to the member 141 by the firing pedal 79, will not cause firing of the gun.

Attention is again invited to the possibility of making numerous variations within the scope of the invention as claimed.

I claim:—

1. In a self-loading gun having a cradle and a cradle-carried barrel which recoils and counter-recoils; a loading tray mounted on said cradle for movement from a raised round-receiving position to a lowered round-placing position, said tray occupying said raised round-receiving position during recoil of said barrel, a retractible self-projecting loading plunger operable in said tray, means for retracting said plunger upon the recoil of said barrel, means for holding said plunger in retracted position to allow dropping of a round into said loading tray, means operable upon the counter-recoil of said barrel for lowering said loading tray to said round-placing position, and means for releasing said plunger-holding means when the tray reaches said round-placing position.

2. In a self-loading gun having a cradle and a cradle-carried barrel which recoils and counter-recoils; a loading tray mounted on said cradle for movement from a raised round-receiving position to a lowered round-placing position, said tray occupying said raised round-receiving position during recoil of said barrel, a retractible self-projecting loading plunger mounted in said loading tray in position to be kicked by said barrel to retracted position when the barrel recoils, means for holding said plunger in retracted position to allow dropping of a round into said loading tray, means operable upon the counter-recoil of said barrel for lowering said loading tray to said round-placing position, and means for releasing said plunger-holding means when the tray reaches said round-placing position.

3. In a self-loading gun having a cradle and a barrel which recoils and counter-recoils; a longitudinally extending channel-shaped loading tray having guides along its opposite sides, slides engaged with said guides, front and rear parallel arms pivotally mounted on said cradle and pivoted to said slides for moving said tray from a raised round-receiving position to a lowered round-placing position, said tray occupying said round-receiving position during recoil of the barrel, means for confining said tray to substantially vertical movement, a retractible self-projecting loading plunger slidably mounted in said tray in position to be kicked by said barrel to retracted position when said barrel recoils, a plunger-holding latch mounted on the aforesaid tray for holding said plunger in retracted position to allow dropping of a round into said tray, means operable upon the counter-recoil of the barrel for swinging said arms to lower said tray to said round-placing position, and means carried by at least one of the aforesaid slides for releasing said latch when said tray reaches said round-placing position.

4. In a self-loading gun having a cradle and a cradle-carried barrel which recoils and counter-recoils; a loading tray mounted on said cradle for movement from a raised round-receiving position to a lowered round-placing position, said tray occupying said raised round-receiving position during recoil of said barrel, a retractible self-projecting loading plunger operable in said tray, means for retracting said plunger upon the recoil of said barrel, means for holding said plunger in retracted position to allow dropping of a round into said loading tray, means operable upon the counter-recoil of said barrel for lowering said loading tray to said round-placing position, means for holding said loading tray in said round-placing position, means for releasing said plunger-holding means while said tray is held in said round-placing position, and means for releasing said tray-holding means as said plunger forces the round from the tray.

5. In a self-loading gun having a cradle and a cradle-carried barrel which recoils and counter-recoils; a loading tray mounted on said cradle for movement from a raised round-receiving position to a lowered round-placing position, said tray occupying said raised round-receiving position during recoil of said barrel, a retractible self-projecting loading plunger operable in said tray, means for retracting said plunger upon the recoil of said barrel, means for holding said plunger in retracted position to allow dropping of a round into said loading tray, means operable upon the counter-recoil of said barrel for lowering said loading tray to said round-placing position, means for holding said loading tray in said round-placing position, means for releasing said plunger-holding means while said tray is held in said round-placing position, and means connected with and actuated by said plunger for releasing said tray-holding means as said plunger forces the round from the tray.

6. In a self-loading gun having a cradle and a barrel which recoils and counter-recoils; a longitudinally extending channel-shaped loading tray having guides along its opposite sides, slides engaged with said guides, front and rear parallel arms pivotally mounted on said cradle and pivoted to said slides for moving said tray from a raised round-receiving position to a lowered round-placing position, said tray occupying said round-receiving position during recoil of the barrel, means for confining said tray to substantially vertical movement, a retractible self-projecting loading plunger slidably mounted in said tray in position to be kicked by said barrel to retracted position when said barrel recoils, a plunger-holding latch mounted on the aforesaid tray for holding said plunger in retracted position to allow dropping of a round into said tray, means operable upon the counter-recoil of the barrel for swinging said arms to lower said tray to said round-placing position, a slide-holding latch mounted on said tray and engageable with at least one of said slides to hold said tray in said round-placing position, means for releasing said plunger-holding latch while said tray is held in said round-placing position, and means connected with and actuated by said plunger for releasing said slide-holding latch as said plunger forces the round from the tray.

7. In a self-loading gun having a cradle and a barrel which recoils and counter-recoils; a longitudinally extending channel-shaped loading tray having guides along its opposite sides, slides engaged with said guides, front and rear parallel arms pivotally mounted on said cradle and pivoted to said slides for moving said tray from a raised round-receiving position to a lowered round-placing position, said tray occupying said round-receiving position during recoil of the barrel, means for confining said tray to substantially vertical movement, a retractible self-projecting loading plunger slidably mounted in said tray in position to be kicked by said barrel to retracted position when said barrel recoils, a plunger-holding latch mounted on the aforesaid tray for holding said plunger in retracted position to allow dropping of a round into said tray, means operable upon the counter-recoil of the barrel for swinging said arms to lower said tray to said round-placing position, a U-shaped slide-holding latch straddling and pivoted to the rear portion of said tray, said slide-holding latch being engageable with said slides to hold said tray in said round-placing position, means for releasing said plunger-holding latch while said tray is held in said round-placing position, and a releasing lug for said slide-holding latch carried by said plunger, said releasing lug and said slide-holding latch having coacting portions for releasing this latch as the plunger forces the round from the tray.

8. In a self-loading gun having a cradle and a barrel which recoils and counter-recoils; a longitudinally extending channel-shaped loading tray having guides along its opposite sides, slides engaged with said guides, front and rear parallel arms pivotally mounted on said cradle and pivoted to said slides for moving said tray from a raised round-receiving position to a lowered round-placing position, said tray occupying said round-receiving position during recoil of the barrel, means for confining said tray to substantially vertical movement, a retractible self-projecting loading plunger slidably mounted in said tray in position to be kicked by said barrel to retracted position when said barrel recoils, a plunger-holding latch mounted on the aforesaid tray for holding said plunger in retracted position to allow dropping of a round into said tray, means operable upon the counter-recoil of the barrel for swinging said arms to lower said tray to said round-placing position, a slide-holding latch mounted on said tray and engageable with at least one of said slides to hold said tray in said round-placing position, means carried by at least one of said slides for releasing said plunger-holding latch while said tray is held in said round-placing position, and means connected with and actuated by said plunger for releasing said slide-holding latch as said plunger forces the round from the tray.

9. In a self-loading gun having a cradle and a barrel which recoils and counter-recoils; a longitudinally extending channel-shaped loading tray having guides along its opposite sides, slides engaged with said guides, front and rear parallel arms pivotally mounted on said cradle and pivoted to said slides for moving said tray from a raised round-receiving position to a lowered round-placing position, said tray occupying said round-receiving position during recoil of the barrel, means for confining said tray to substantially vertical movement, a retractible self-projecting loading plunger slidably mounted in said tray in position to be kicked by said barrel to retracted position when said barrel recoils, a plunger-holding latch mounted on the aforesaid tray for holding said plunger in retracted position to allow dropping of a round into said tray, means operable upon the counter-recoil of the barrel for swinging said arms to lower said tray to said round-placing position, a U-shaped slide-holding latch straddling and pivoted to the rear portion of said tray, said slide-holding latch being engageable with said slides to hold said tray in said round-placing position, means carried by said slides for releasing said plunger-holding latch while said tray is held in said round-placing position, and a releasing lug for said slide-holding latch carried by said plunger, said releasing lug and said slide-holding latch having coacting portions for releasing this latch as the plunger forces the round from the tray.

10. In a self-loading gun having a cradle, a barrel which recoils and counter-recoils, and a loading mechanism; a rack bar slidably mounted on said cradle, extending longitudinally of the gun and operatively connected with said loading mechanism for operating the latter, a pinion meshing with said rack bar, a slide rotatably carrying said pinion and mounted on said cradle for movement unidirectionally with said rack bar, a second rack bar mounted slidably on said cradle in parallel relation with the first mentioned rack bar and in mesh with said pinion, said second rack bar being held in a forward position by said barrel when the gun is in battery position but being free to slide rearwardly when said barrel recoils, means for sliding said second rack bar rearwardly when said barrel recoils causing said pinion to roll rearwardly along the first named rack bar and causing rearward sliding of said slide, a latch for holding said slide temporarily in its rearward position whereby upon counter-recoil the barrel will forwardly return said second named rack bar to effect rotation of said pinion and rearward sliding of the first named rack bar to actuate said loading means, means for releasing said latch as the counter-recoil terminates, and means for then forwardly sliding said first named rack bar to its original position and thereby resetting said pinion and slide at their original positions.

11. In a self-loading gun having a cradle, a cradle-carried barrel which recoils and counter-recoils, a magazine, and an oscillatory ratchet member for feeding rounds from said magazine, a slidable and oscillatory longitudinal shaft carried by said cradle and operatively connected with said oscillatory ratchet member of the magazine, spring means operatively related with said shaft for sliding the latter rearwardly when permitted to do so, said shaft being held against sliding by means of the gun barrel until said barrel recoils, and cam means for turning said shaft in one direction when said shaft is rearwardly slid by said spring means and for turning said shaft in the other direction when the barrel counter-recoils and forwardly returns said shaft.

12. In a self-loading gun, a rearwardly open cylindrical casing to receive a cylindrical clip which carries an annular series of rounds, said casing having a round-exit slot, a rotatable spider in said casing having arms for reception between the clip carried rounds for feeding the latter toward said round-exit slot, a tubular shaft secured to the front wall of said casing and disposed centrally within said casing for rotatably mounting said spider, latch means mounted within the rear end of said tubular shaft for holding the clip in the casing, and means for actuating said spider including ratchet means mounted within said tubular shaft.

13. In an automatic recoil-operated gun having automatic loading means, automatic firing means, a magazine, and automatic means for feeding rounds one at a time from said magazine to said loading means; a round-engaging feeler mounted near the path upon which the magazine-contained rounds are fed, a lock for said firing means to prevent operation thereof, and connections between said feeler and said lock for preventing the latter from locking said firing means until said feeler is released by feeding the last round from the magazine and for insuring such locking before said last round has been fired, leaving said last round in readiness to resume automatic gun operation upon refilling of the magazine.

14. A clip for a substantially annular series of rounds, comprising a flat C-shaped plate having inturned flanges along its inner and outer edges providing a channel to slidably hold the peripherally ribbed butt ends of shell cases, a closure carried by said plate for one end of said channel, a releasable gate carried by said plate for the other end of said channel, and a C-shaped hub-forming flange projecting from one side of said plate and joined to the inner edge of said plate.

15. A clip rack comprising a vertical shaft, a plurality of vertically spaced bodies carried by said shaft to be horizontally straddled by C-shaped clips, said bodies having projecting means to overlie and underlie the clips, and manually releasable latches carried by said bodies to engage the clips and hold them engaged with said bodies.

16. In an automatic recoil-operated gun having a removable round carrier which successively presents the rounds to the gun-loading mechanism; locking means operative to prevent gun firing, and automatic means for normally holding said locking means released and for causing operation of said locking means before the last round fed from said carrier can be fired, leaving said last round in readiness to resume automatic gun operation when a loaded carrier is substituted for the empty carrier, said automatic means having a controlling feeler mounted for contact with the carrier-held rounds.

17. In an automatic recoil-operated gun having a removable round carrier which successively presents the rounds to the gun-loading mechanism; locking means operative to prevent gun firing, and automatic means for normally holding said locking means released and for causing operation of said locking means to prevent firing of the last round fed from said carrier into the gun breech, leaving said last round loaded into the breech in readiness to resume automatic gun operation when a loaded carrier is substituted for the empty carrier, said automatic means having a controlling feeler mounted for contact with the carrier-held rounds.

18. In an automatic recoil-operated gun having a removable round carrier which successively presents the rounds to the gun-loading mechanism; locking means operative to prevent gun firing, and automatic means controlled by the loaded carrier for normally holding said locking means released and for causing operation of said locking means before the last round fed from said carrier can be fired, leaving said last round in readiness to resume automatic gun operation when a loaded carrier is substituted for the empty carrier, said automatic means having a controlling feeler mounted for contact with the carrier-held rounds.

19. In an automatic recoil-operated gun having a removable round carrier which successively presents the rounds to the gun-loading mechanism; locking means operative to prevent gun firing, and automatic means controlled by the loaded carrier for normally holding said locking means released and for causing operation of said locking means to prevent firing of the last round fed from said carrier into the gun breech, leaving said last round loaded into the breech in readiness to resume automatic gun operation when a loaded carrier is substituted for the empty carrier, said automatic means having a controlling feeler mounted for contact with the carrier-held rounds.

20. In an automatic recoil-operated magazine-type gun having automatic loading and firing mechanisms; self-applying locking means capable of locking said firing mechanism against operation, and round-contacting means held by the magazine-contained rounds and connected with said locking means for holding said locking means released only until the last round leaves the magazine, whereby said locking means may function to prevent firing of the last round fed from the magazine until the magazine has been re-filled, said last round being then in readiness to resume automatic gun operation.

21. In an automatic recoil-operated magazine-type gun having a breech block, automatically cocked firing means, tripping means for said firing means self-actuating to fire the gun when forced in one direction and released, and means for forcing said tripping means in said one direction when said breech block is opened and for releasing said tripping means when said breech block is closed; a self-applying lock capable of locking said tripping means in said one position, and round-contacting means held by the magazine-contained rounds for holding said lock in released position only until the last round leaves the magazine, whereby said lock may engage and lock said tripping means when the latter is next forced to said one position, preventing firing of the last round fed from the magazine until the magazine has been re-filled, said last round being then in readiness to resume automatic gun operation.

22. In an automatic recoil-operated magazine-type gun having a breech block, automatically cocked firing means, tripping means for said firing means self-actuating to fire the gun when forced in one direction and released, and means for forcing said tripping means in said one direction when said breech block is opened and for releasing said tripping means when said breech block is closed; a self-applying locking member movably mounted in a position for engagement with said tripping means to lock the same in said one position when desired, a rockably mounted shaft having an arm connected with said locking member, said shaft being provided with a feeler engaged by the magazine-contained rounds, said feeler, shaft and arm being operable to hold said locking member in released position only until the last round leaves the magazine, whereby said locking member may engage and lock said tripping means when the latter is next forced to said one position, preventing firing of the last round fed from the magazine until the magazine has been refilled, said last round being then in readiness to resume automatic gun operation.

23. In an automatic recoil-operated gun having a breech block, a rotary round-holding and feeding clip above said breech block, automatically cocked firing means, a slidably mounted spring-actuated tripping rod for said firing means extending longitudinally of the gun and operative to fire the same when slid forwardly and released, and means for forcing the tripping rod forwardly when said breech block is opened and for releasing said tripping rod when said breech block is closed; a vertically shiftable locking member disposed over said tripping rod for locking this rod in its forward position when said locking member is lowered, a rock shaft mounted above and parallel with said tripping rod, the front end of said rock shaft being provided with an arm which normally suspends said locking member out of engagement with said tripping rod, and a feeler secured to the rear end of said rock shaft in position to contact successively with the clip-held rounds as the clip is rotated, said feeler being operative to so hold said rock shaft as to suspend said locking member above said rod until the last round is fed from the clip, and to then immediately allow said locking member to lower and lock said tripping rod.

BRYAN P. JOYCE.